UNITED STATES PATENT OFFICE.

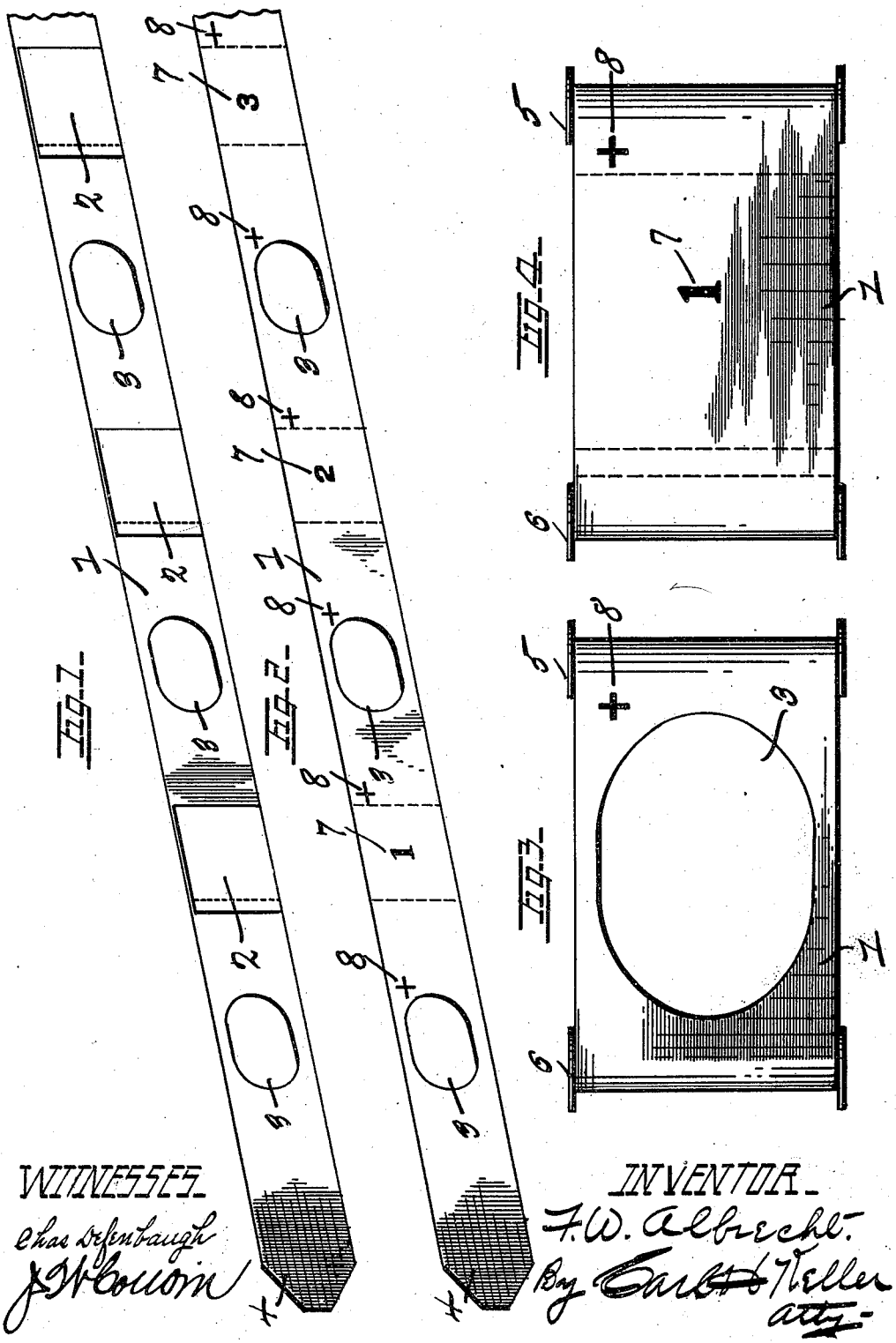

FREDERICK W. ALBRECHT, OF TOLEDO, OHIO.

PHOTOGRAPHIC ROLL-FILM.

SPECIFICATION forming part of Letters Patent No. 687,184, dated November 26, 1901.

Application filed April 24, 1901. Serial No. 57,174. (No model.)

*To all whom it may concern:*

Be it known that I, FREDERICK W. ALBRECHT, of Toledo, county of Lucas, and State of Ohio, have invented certain new and useful Improvements in Photographic Roll-Films; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention has reference to an improvement in photographic roll-films of the class in which a section of sensitive film is inclosed by an opaque ribbon to form a roll, the same being wound upon a suitable spool. In the present state of the art to which my invention relates no simple and inexpensive means are provided for focusing a camera in which film-rolls are employed. With the object of supplying a film-roll which shall permit of focusing the camera before making an exposure my invention is constructed.

To this end my invention comprises certain novel features hereinafter shown, described, and claimed.

In the drawings, Figure 1 is a perspective view of a ribbon having sections of sensitive film secured thereon and openings therethrough between the film-sections, the same embodying my invention. Fig. 2 is a similar view showing the reverse side of the ribbon. Fig. 3 is an enlarged view showing the ribbon wound upon the spools usually employed for this purpose. The same discloses the opening provided in the ribbon to permit of focusing the camera. Fig. 4 is an enlarged view showing the ribbon advanced, the first section of film thereon being in position for exposure.

1 is a strip or ribbon of flexible opaque material, the same forming a roll by being wound upon a suitable spool. This may be a strip of black paper, or a suitable fabric may be employed for this purpose. Upon the ribbon are secured at suitable distances apart sections of sensitive film 2 in common use in the art, the same being a thin sheet of nitrocellulose provided with a coating of gelatino-argentic emulsion. Film-sections 2 are preferably secured to the ribbon 1 along one edge only, and the same may be perforated parallel to their fastening edges to facilitate detachment from the ribbon. I do not, however, desire to be confined to any particular fastening means for securing the film-sections, as any suitable means may be employed for this purpose. 3 represents openings in the ribbon arranged therethrough at points midway between the film-sections. These may be of any suitable contour; but I prefer to form the same as an oval, this form being most practical for use, as no protruding edges are presented to be engaged and torn as the ribbon is transferred from one spool to the other.

In practicing my invention the end 4 of the ribbon is attached to a suitable spool. Located near the end 4 is the first opening 3 through the ribbon to permit of focusing the camera. The first film to be exposed is secured to the ribbon 1 at a point sufficiently remote from the first opening through the ribbon to permit of winding the section of ribbon provided with the opening upon one spool before the section of ribbon to which the film is attached has started to unwind from the other spool. The second opening through the ribbon is distant from the first film-section a length equal to the distance of the first opening from said section. In like manner the remaining openings and film-sections are arranged alternately at equal distances apart. The operation of the film-holder is illustrated in Figs. 3 and 4. The spool from which the ribbon is unwound is shown at 5 and that upon which the ribbon is wound after the films have been exposed at 6. Where a camera is arranged to employ my film-holder, the same is provided with a ground glass in contact with the rear face of the ribbon. The ribbon is unwound to bring the first opening therethrough before the ground glass. The image is then focused upon the ground glass through the opening in the ribbon. The proper focus being obtained, the ribbon is advanced to present the film before the ground glass, the section of the ribbon upon which the film is mounted intervening between it and the film to exclude the light. The film after exposure is wound upon the spool with the ribbon in the usual manner, and the second opening through the ribbon will then be in position for focusing preparatory to exposing the second film. In this manner any number of films can be arranged upon the ribbon 1, and an opening will be provided through the ribbon in advance of each film. Upon the rear face of the ribbon, at a point about central of the film-sections, are provided numbers 7 to identify the films. I also provide suitable markings 8 in proximity to the openings 3 and also in proximity to the film-sections 2, the same being adapted to register with an opening in the rear of the camera-case. By thus marking the ribbon the proper position of the film is insured.

From the foregoing the utility and novelty of my invention will be apparent.

What I claim, and desire to secure by Letters Patent, is—

1. The improvement in photographic roll-films, comprising a ribbon of opaque, flexible material having a plurality of photographic films secured thereto and openings therethrough to alternate with the films.

2. The improvement in photographic roll-films, comprising a ribbon of opaque, flexible material having a plurality of photographic films secured thereto at intervals and oval openings arranged therethrough between the films.

3. The improvement in photographic roll-films, comprising a ribbon of opaque, flexible material having a plurality of photographic films secured thereto at intervals, and having openings arranged therethrough between the films, the ribbon extending a sufficient length on each side of the openings to protect the films from light, as set forth.

4. The improvement in photographic roll-films, comprising an opaque, flexible ribbon having a plurality of photographic films secured thereto and openings therethrough to alternate with the films, and having markings upon the rear face thereof in proximity to the openings and to the films, for the purpose set forth.

In testimony that I claim the foregoing as my own I affix my signature in presence of two witnesses.

FREDK. W. ALBRECHT.

Witnesses:
  CARL H. KELLER,
  ALBERT L. HENNING.